(12) United States Patent
Lee

(10) Patent No.: US 6,728,001 B1
(45) Date of Patent: Apr. 27, 2004

(54) METHOD FOR PRINTING IN NETWORK SYSTEM

(75) Inventor: Jin-Tack Lee, Cheonrabuk-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 854 days.

(21) Appl. No.: 09/594,175

(22) Filed: Jun. 15, 2000

(30) Foreign Application Priority Data

Jul. 26, 1999 (KR) .......................................... 1999/30280

(51) Int. Cl.⁷ .............................................. G06K 15/00
(52) U.S. Cl. ...................................... 358/1.15; 358/1.14
(58) Field of Search .................................... 358/1.1, 1.13, 358/1.14, 1.15, 403, 407; 710/3, 4, 9, 14, 26, 64

(56) References Cited

U.S. PATENT DOCUMENTS 6,452,692 B1 * 9/2002 Yacoub ...................... 358/1.15
6,529,286 B1 * 3/2003 King .......................... 358/1.14

* cited by examiner

Primary Examiner—Arthur G. Evans
(74) Attorney, Agent, or Firm—Robert E. Bushnell, Esq.

(57) ABSTRACT

A process for printing in network system which includes a printer server with a network printer card, and at least a client connected to the printer server by network is provided. According to the present invention, when power is supplied to the printer server, the network address of an agent client for temporarily storing print data of the client which requires printing operation while the printer server is in printing operation is firstly detected. Then, it is checked whether the printer server is in printing operation or not when the printing operation is required from the client. If the printer server is in printing operation, a print-rejection message and the network address of the agent client is transmitted to the print operation-requiring client. When presently performed printing operation is completed, the print data stored in the agent client is printed.

7 Claims, 5 Drawing Sheets

METHOD FOR PRINTING IN NETWORK SYSTEM

CLAIM OF PRIORITY

This application makes reference to, incorporates the same herein, and claims all benefits accruing under 35 U.S.C. §119 from the inventor's application METHOD FOR PRINTING IN NETWORK SYSTEM filed with the Korean Industrial Property Office on Jul. 26, 1999 and there duly assigned Serial No. 30280/1999.

BACKGROUND OF THE INVENTION

1. Field of the Invention

This invention relates to a process for printing in network system. More specifically, the invention relates to a method and apparatus for reducing traffic in a printer without a spooler which is connected to at least one computer and network system.

2. Description of the Related Art

Developments in the computer technology have caused user demand also to be diversified. To satisfy such diversified user demand, computer operating systems now include a network operating system (NOS) and distributed operating system (DOS), which supply a variety of functions by organically interconnecting a number of small-scale computers.

Generally, a network system is a communication structure including at least two devices interconnected for data communication purpose; and it transmits data between the interconnected devices. Transmitting devices and exchanging devices used for performing data communication are also connected to the communication structure via such communication lines. The network system includes the Internet of connecting computers all around the world, local area networks (LANs) formed by connecting computers in a local area, and wide area networks (WANs) formed by connecting computers in a wide area.

An exclusive printer server or a network printer card is used for sharing sources, especially for sharing a printer, in the network system. When the presently performed printing process is completed, the spooler successively transmits the stored print data to the printer. The client-server model necessarily requires the exclusive printer server. To overcome this, a printer server often includes a network printer card.

A printer server with a network printer card is connected to the network system connected to at least one computer. Unlike the exclusive printer server, a printer server with a network printer card generally does not include a storage device for storing print data. As a result, the printer server can print data received from only one client and, in the event that printing process is required from more than one client or if a printing process is required from the client while the printer server is in printing operation, the network printer card of the printer server probably will not be able to perform the printing process. The printer server will therefore transmit a print-rejection message to the client that requested the printing operation. The print-rejection message receiving client then continuously transmits a message to the printer server for the required printing operation until the printing process is completed and a print-allowance message is received from the printer server. A printer server with a network printer card does not require an exclusive printer server. However, the printer server with the network printer card can perform a printing process required from only one client, since the printer server with the network printer card does not include a spooler for storing data received from the client. The continuous transmission of the printing-operation-required message from the client until the print-allowance message is received results in increased network traffic, which it would be desirable to avoid.

SUMMARY OF THE INVENTION

It is therefore an object of the present invention to provide an improved network printing system and process.

It is another object to provide a network printing system and process able to reduce traffic in the network system generated by a printer with a network printer card and to supply users with smoother print service.

It is still another object to provide a network printing system and process that reduces need for continuous transmission of printing operation requests from the client while the client awaits reception of a print-allowance message.

These and other objects may be attained according to the present invention by providing a network system and process according to the invention. The improved system comprises a printer server with a network printer card, and at least one client connected to the printer server by network. The process of the present invention includes the steps of: as power is supplied to the printer server, detecting the network address of an agent client for temporarily storing print data from the client which requires printing operation while the printer server is in printing operation; when printing operation is required from the client, checking whether the printer server is in printing operation or not; if the printer server is in printing operation, transmitting a print-rejection message and the detected network address of the agent client to the printing operation-requiring client; and when the presently performed printing operation is completed, printing the print data stored in the agent client.

Preferably, when the print-rejection message is received from the printer server, the printing operation-requiring client transmits print data to be printed through the printer server to the network address of the agent client.

Preferably, the step of detecting the network address of the agent client further includes steps of: transmitting message for requiring transmission of the network address of the agent client to the clients from the printer server; transmitting the network address of the agent client receiving the network address-requiring message among the clients to the printer server; and, when the network address of the agent client is received, storing the network address in the printer server.

Preferably, the printing step further includes the steps of: transmitting a command for requiring transmission of the print data to the network address of the agent client; checking whether the print data is received from the agent client or not; and printing the print data received from the agent client.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components.

DETAILED DESCRIPTION OF THE PREFERRED EMBODIMENTS

Figure 1:
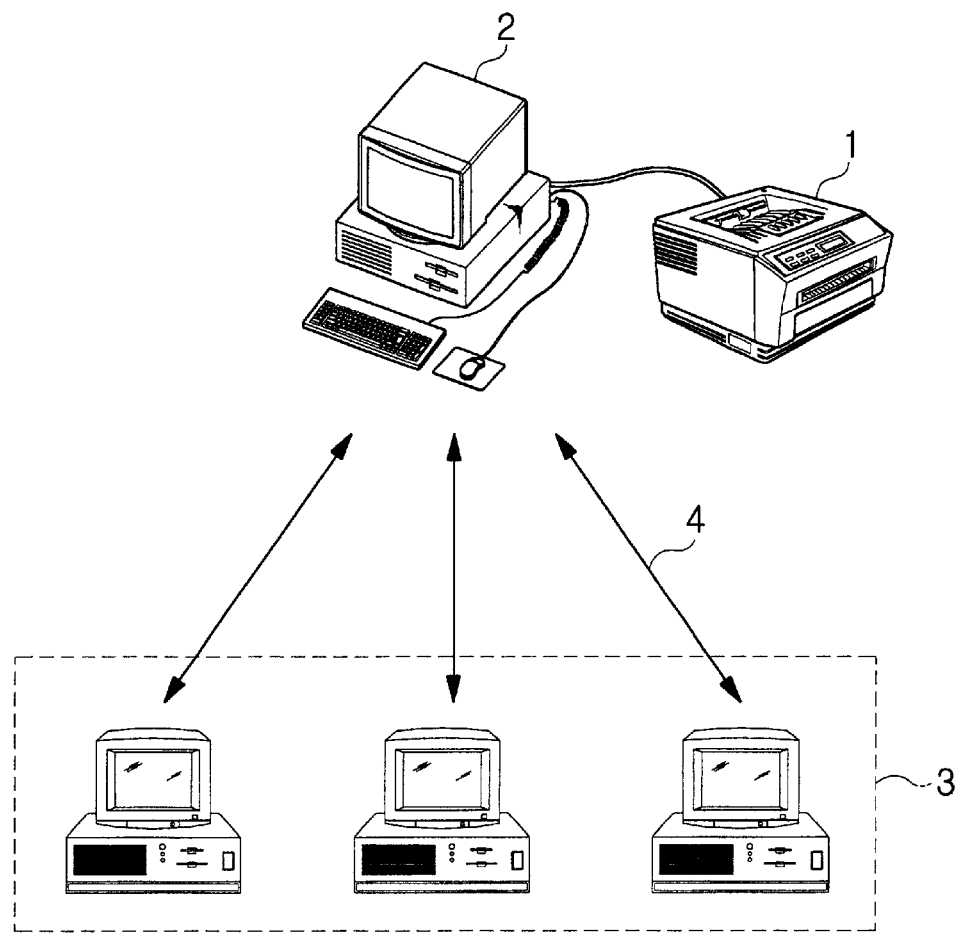
FIG. 1 illustrates a known printing process required from a client of a network system to which an exclusive printer server is connected.

Referring now to the drawings, FIG. 1 illustrates printing process required from a client of a network system to which an exclusive printer server is connected. In FIG. 1, the exclusive printer server is connected to the network system including at least one computer connected thereto and a printer is connected to the exclusive printer server connected to the network system.

Referring to FIG. 1, the network system includes: a printer 1 for performing printing process; an exclusive printer server 2 directly connected to the printer 1 and performing printing process by driving the printer 1; at least one client 3 requiring printing process of exclusive printer server 2; and a communication line 4 interconnecting exclusive printer server 2 and client 3. Exclusive printer server 2 and client 3 are personal computers or work stations.

In such a client-server model, printer server 2 operates in the following manner. First, exclusive printer server 2 checks printer 1 when printing process is required from client 3 and transmits a print-allowance message to client 3 if printer server 2 is capable of presently performing the printing process. Upon receiving the print-allowance message, client 3 transmits data to be printed to exclusive printer server 2 through communication line 4. Exclusive printer server 2 transmits the received data to printer 1 and then printer 1 prints the data.

Exclusive printer server 2 includes a spooler, i.e., a queue system. The spooler temporarily stores the print data received from client 3 in a storage device, e.g., a hard disk, when printing operation is required from a plurality of clients 3, or when the printing operation is required while the printer is in printing process. When the presently performed printing process is completed, the spooler successively transmits the stored print data to printer 1. However, the client-server model necessarily requires the exclusive printer server. To overcome this difficulty, a printer server including a network printer card has been provided.

Figure 2:
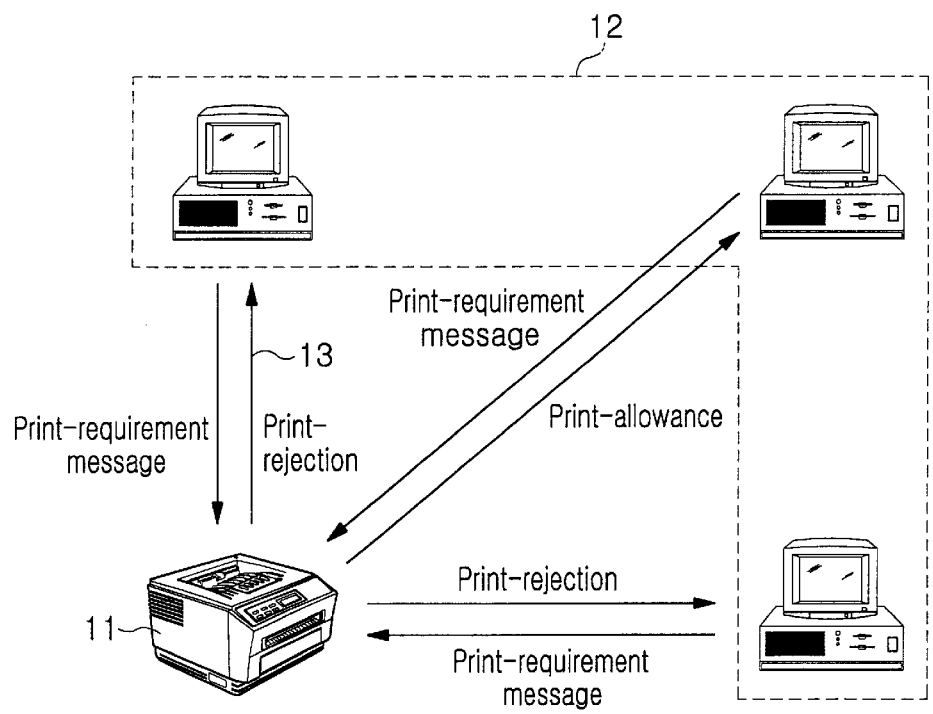
FIG. 2 illustrates a known printing process required from a client of a network system to which a printer with a network printer card is connected.

FIG. 2 illustrates printing process required from a client of a network system to which a printer with a network printer card is connected. A printer server with the network printer card is connected to the network system connected to at least one computer.

Turning now to FIG. 2, the network system includes: a printer server 11 including a network printer card instead of a spooler, for performing printing process; at least one client 12 requiring printing process of printer server 11; and a communication line 13 interconnecting printer server 11 and client 12.

Printer server 11 including the network printer card operates in the following manner. First, when printing command is received from client 12, the network printer card of printer server 11 checks whether the presently received printing command can be performed or not. Then, if the printing command can be performed, printer server 11 transmits a print-allowance message to client 12. As receiving the print-allowance message, client 12 transmits data to be printed to printer server 11 through communication line 13. The network printer card of printer server 11 then prints the data received from client 12.

Differently from the exclusive printer server, printer server 11 with the network printer card generally does not include a storage device for storing print data. As a result, printer server 11 can print data received from only one client 12. Accordingly, in the event that printing process is required from more than one client 12, or printing process is required from client 12 while printer server 11 is in printing operation, the network printer card of printer server 11 cannot perform the printing process. In this case, the network printer card of printer server 11 transmits a print-rejection message to client 12 which requires the printing operation. Then, the print-rejection message received client 12 continuously transmits a message for requiring the printing operation to the printer server 11 until the presently performed printing process is completed in printer server 11 and print-allowance message is received from printer server 11.

Printer server 11 with the network printer card does not require an exclusive printer server. However, printer server 11 with the network printer card can perform printing process required from only one client since printer server 11 with the network printer card does not include a spooler for storing data received from the client. The continuous transmission of the printing operation-requiring message from the client until the print-allowance message is received results in increased network traffic.

The present invention will now be described more fully hereinafter with reference to the accompanying drawings. Like reference symbols in the drawings indicate the same or similar components. Specification of components, such as components of circuits are provided for description purpose. It is therefore apparent to those skilled in this art that the present invention can be embodied without the specified components. The detailed description might be omitted when it is determined that related prior art or the detailed description of the structure may unnecessarily make indistinct the point of the present invention.

Figure 3:
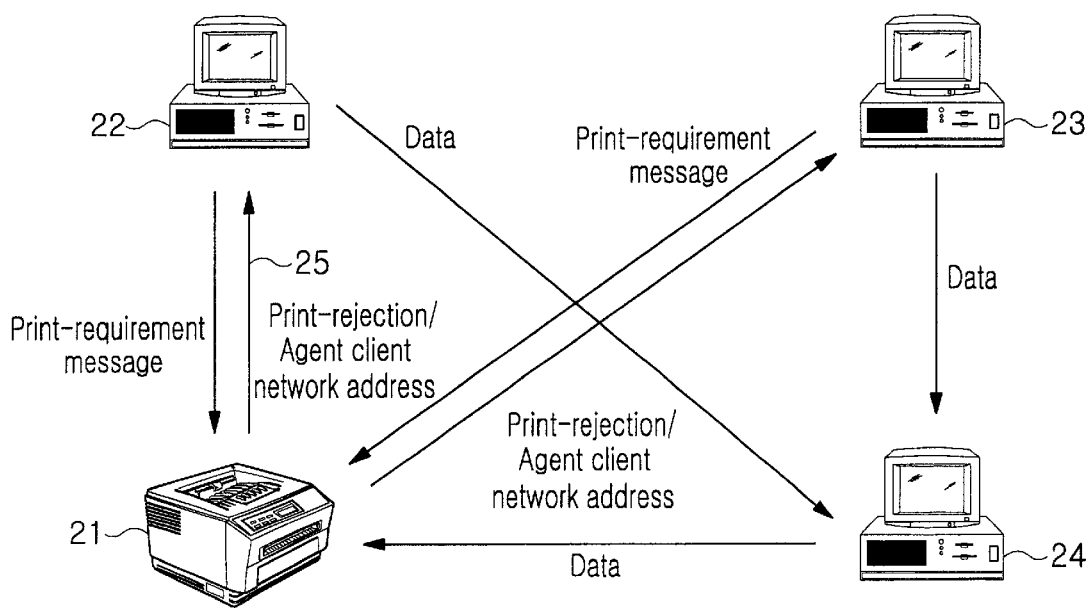
FIG. 3 illustrates printing process required from a client of a network system to which a printer with a network printer card according to the present invention is connected.
Figures 1, 4:
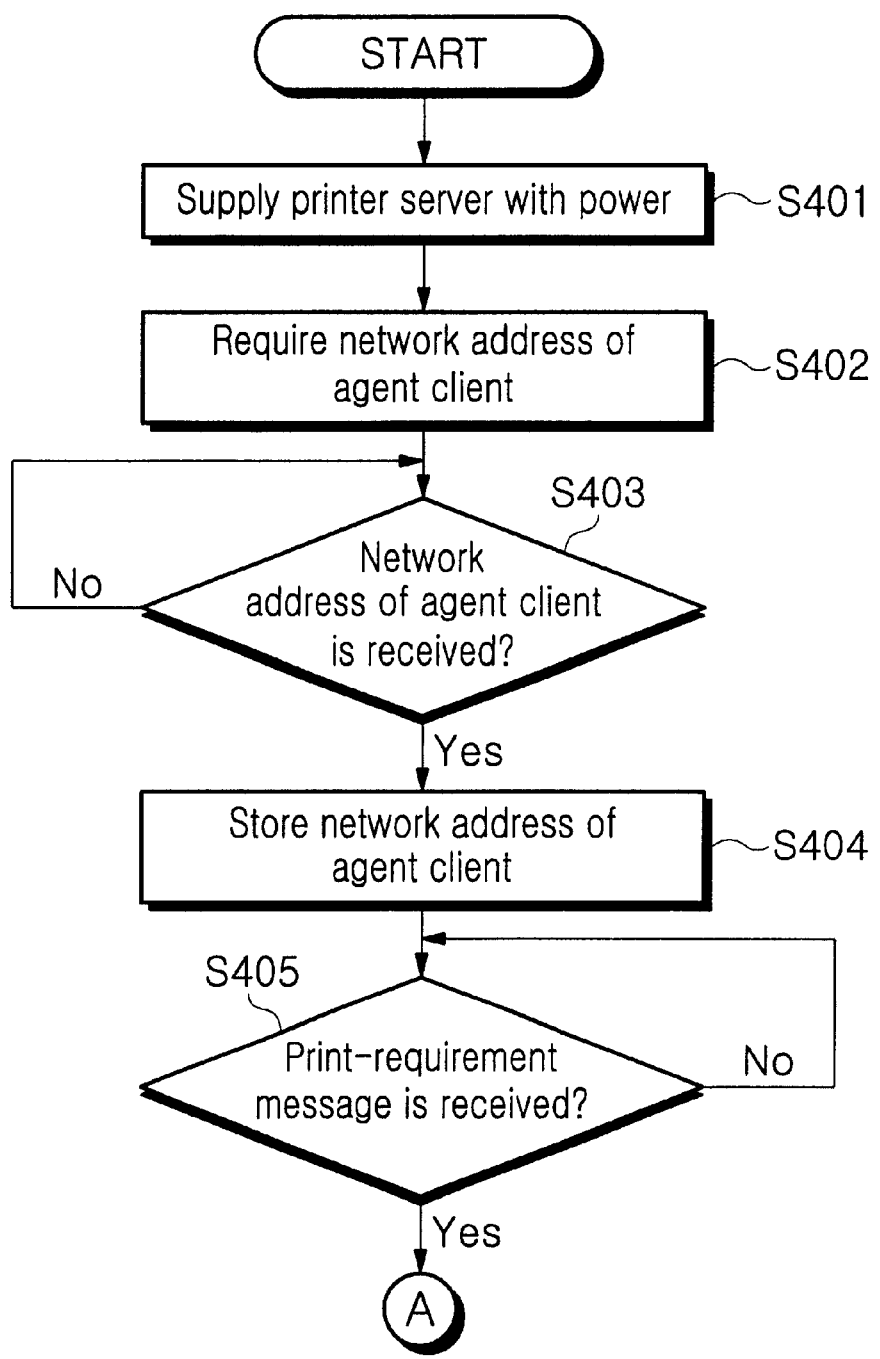
FIG. 4 is a flowchart showing printing operation in the network printer according to the present invention.
Figures 2, 4:
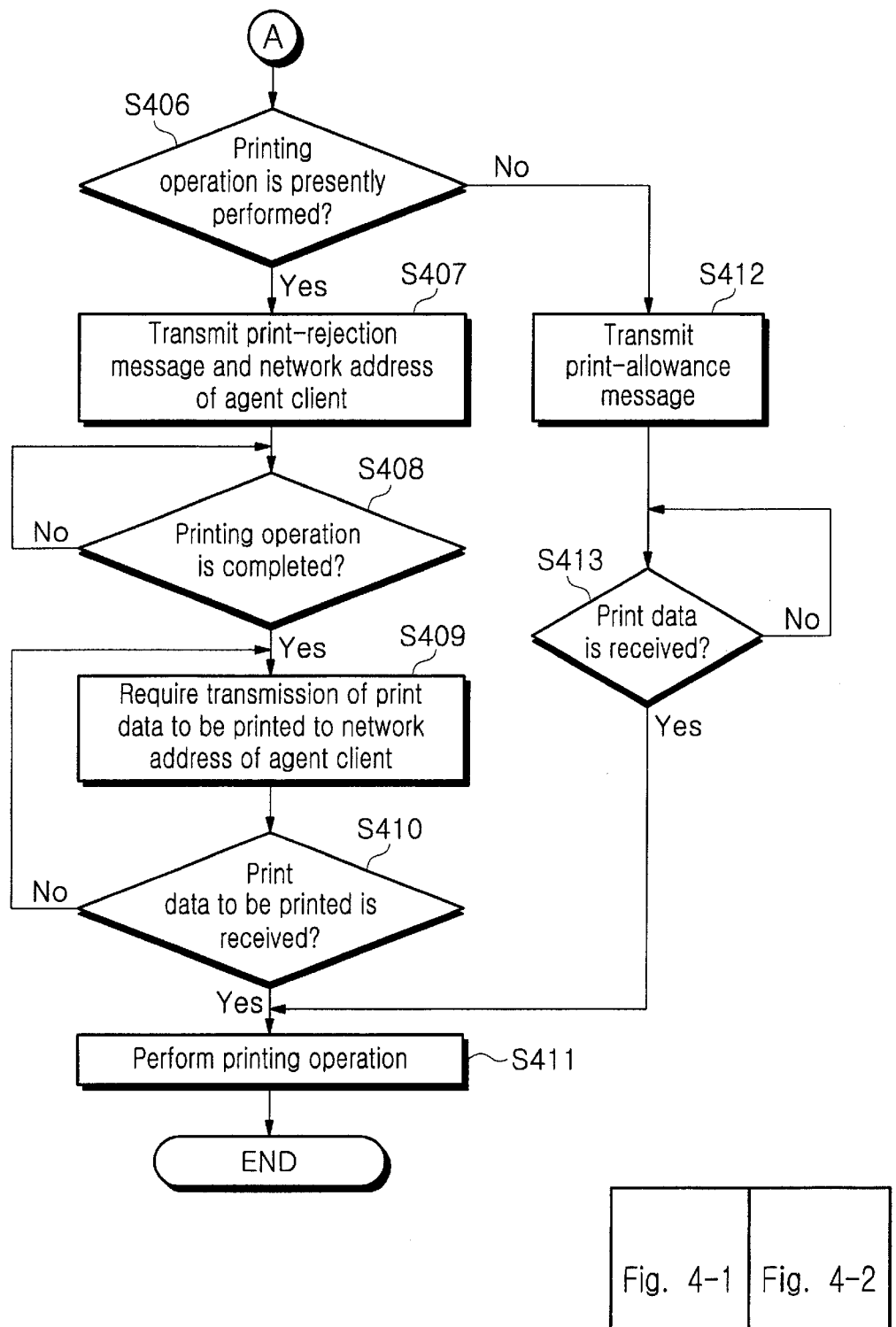
Figure 5:
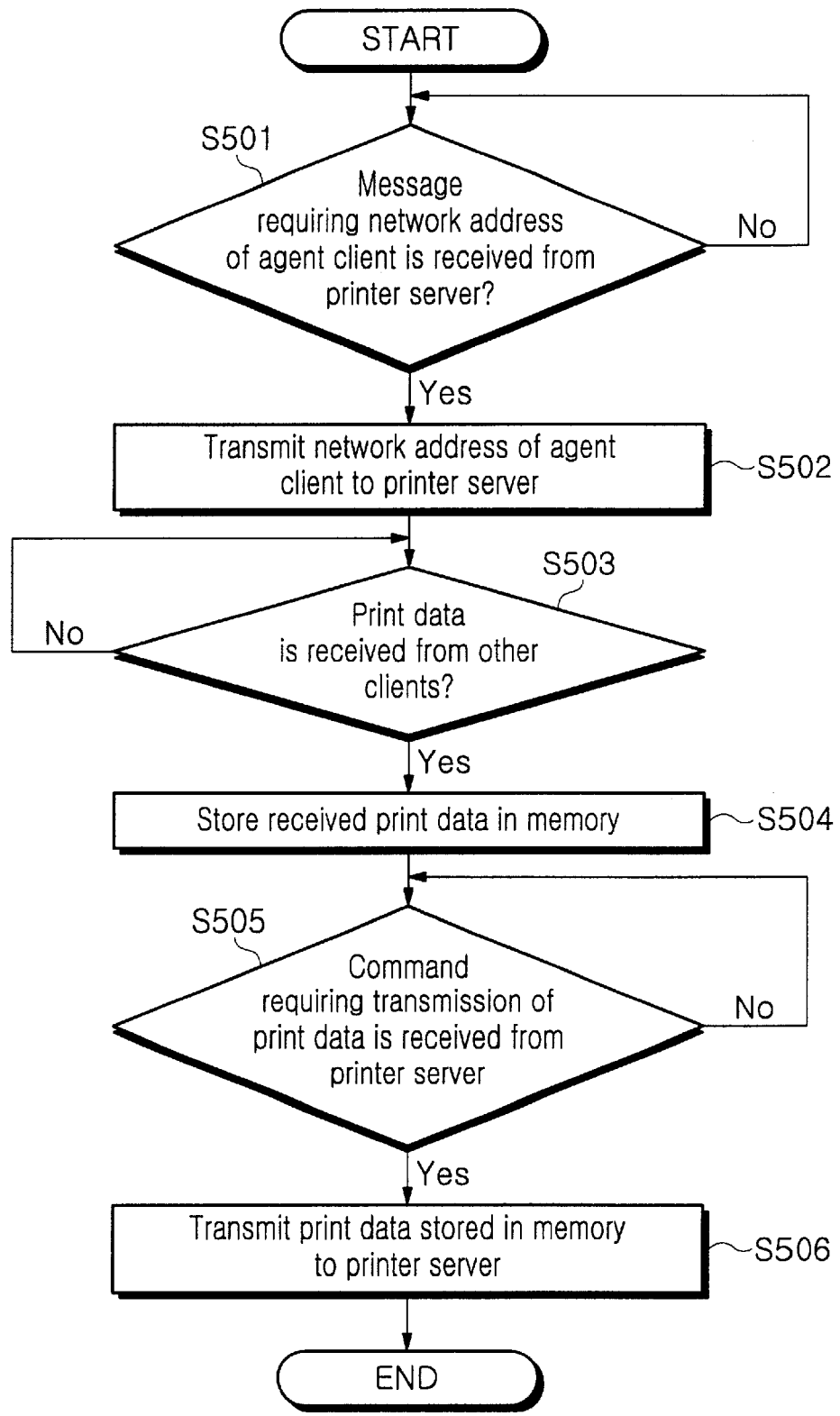
FIG. 5 is a flowchart showing the operation of an agent client according to the operation of FIG. 4.

FIG. 3 illustrates printing process required from a client of a network system to which a printer with a network printer card according to the present invention is connected, FIG. 4 is a flowchart showing printing operation in the network printer according to the present invention, and FIG. 5 is a flowchart showing the operation of an agent client according to the operation of FIG. 4. Referring again to FIG. 3, the network system includes: a printer server 21 including a network printer card instead of a spooler, for performing printing operation; at least a client 22, 23 and 24 that require printing operation of printer server 21; and a communication line 25 for interconnecting the printer server 21 and clients 22, 23 and 24. Clients 22, 23 and 24 are not limited to the three computer as shown in the drawing.

According to the preferred embodiment of the present invention, clients 22, 23 and 24 include an agent client 24 for mediating print data transmission between printer server 21 and the client and providing a spooling service. Agent client 24 includes an application program for: when printer server 21 is in printing operation, temporarily storing print data of the client which requires printing operation in a memory; and when printer server 21 is in print-possible state, transmitting the temporarily stored print data to the printer server.

Referring to FIGS. 4 and 5, the operation of the present invention structured as above will be described in detail. Referring to FIG. 4, when power is supplied to printer server 21 (S401), the printer card included in printer server 21 transmits to the network system a message for requiring transmission of the network address of agent client 24 through communication line 25 (S402). Agent client 24 includes an application program for temporarily storing print data of one of clients 22, 23 and 24 therein and providing with spooling service. The message for requiring transmission of the network address of agent client 24 transmitted from the network printer card is transmitted to clients 22, 23 and 24 interconnected as the network system according to simple network management protocol (SNMP) that is a predetermined protocol.

Thereafter, the network printer card of the printer server checks whether the network address of agent client 24 of the clients 22, 23 and 24 interconnected to the network system through communication line 25 is received or not (S403), and, when the network address of agent client 24 is received, stores therein the received network address of the agent client 24 (S404).

After the network address of agent client 24 connected to the network system is detected, the network printer card of printer server 21 checks whether print-requirement message is received from clients 22,23 and 24 through communication line 25 or not (S405). If it is checked that the print-requirement message is received from clients 22, 23 and 24, the network printer card then checks whether printer server 21 is presently in printing operation or not (S406).

If it is checked that printer server 21 is in printing operation, printer server 21 cannot store the print data received from the other clients since printer server 21 does not include a spooler. Accordingly, the network printer server detects the network address of agent client 24 stored at step S404 and transmits print-rejection message and the detected network address of agent client 24 to the client that transmitted the print-requirement message at step S405 (S407).

The client which transmits the print-requirement message to printer server 21 and receives the print-rejection message and the network address of agent client 24 from printer server 21, transmits print data to agent client 24 through communication line 25. The network printer card of printer server 21 checks whether the presently performed printing operation is completed or not (S408) and, if it is checked that the printing operation is completed, transmits a command for requiring transmission of the print data stored at the network address of agent client 24 at step S404 through communication line 25 (S409). Then, the network printer card of printer server 21 checks whether the print data is received from agent client 24 or not (S410) and performs printing operation when the print data is received (S411), which is completion of the operation of the present invention. If it is checked that printer server 21 is not in the printing operation at step S406, the network printer card transmits print-allowance message to the client which transmits the print-requirement message (S412). Thereafter, it is checked whether the print data is received from the print-allowance message-transmitted client (S413). If it is checked that the print data is received from the print-allowance message-transmitted client, step S413 is followed by step S411 for performing the printing operation.

Referring to FIG. 5, the operation of the agent client which receives the print data from the clients 22, 23 and 24 and transmits the print data to the printer server 21 will be described. As shown in FIG. 5, the application program of agent client 24 checks whether the message for requiring transmission of the network address of agent client 24 is received in the printer card of printer server 21 through communication line 25 or not (S501).

If it is checked that the message for requiring transmission of the network address of agent client 24 is received, the application program transmits the network address of agent client 24 to the printer server 21 (S502).

Thereafter, the application program of agent client 24 checks whether print data is received from the client which receives the print-rejection message from printer server 21 or not (S503), and stores the received print data in the memory (S504).

The application program of agent client 24 stores the print data of the print-requirement-rejected client in the memory and, at the same time, checks whether the command for requiring transmission of the print data stored in the memory is received in the printer server 21 or not (S505).

If it is checked that the command for requiring transmission of the print data is received in the network printer card of printer server 21, the application program of agent client 24 transmits firstly received print data among print data stored in the memory to printer server 21 through communication line 25. Therefore, network traffic can be reduced by temporarily storing the print data in the client connected to the printer without spooler by network system.

It will be apparent to those skilled in the art that various modifications and variations can be made in the present invention without departing from the spirit or scope of the invention. Thus it is intended that the present invention cover the modifications variations of this invention provided they come within the scope of the appended claims and their equivalents.

As described above, the process of the present invention is capable of reducing network traffic and providing smooth print service by temporarily storing print data in an agent client connected as network system when print demand is received from a plurality of clients which are interconnected as network system under the condition that the network printer without a spooler is in printing operation.

What is claimed is:

1. A process for printing in a network system, said network system including a printer server with a network printer card, said network system connecting at least one client connected to said printer server, said printer having an ON mode and an OFF mode, said process comprising the steps of:

(1) when power is supplied to said printer server to place said printer in ON mode, detecting a network address of an agent client for temporarily storing print data from said client when said client requiring a next printing operation and said printer server is already engaged in a current printing operation;

(2) when said next printing operation is required from said client, checking whether said printer server is engaged in a current printing operation;

(3) when said printer server is in engaged in a current printing operation, transmitting a print-rejection message and said detected network address of said agent client to said client requiring a next print operation; and (4) when said printer server has completed said current printing operation, printing said print data stored in said agent client, whereby said next printing operation is performed.

2. The process of claim 1, wherein when said print-rejection message is received from said printer server, print data to be printed through said printer server is transmitted to said network address of said agent client by said client requiring a next printing operation.

3. The process of claim 1, wherein said step of detecting said network address of said agent client comprises the steps of:

(a) transmitting an address-requiring message for requiring transmission of said network address of said agent client to said clients from said printer server;

(b) transmitting said network address of said agent client receiving said network address-requiring message among said clients to said printer server; and (c) when said network address of said agent client is received, storing said network address in said printer server.

4. The process of claim 1, wherein said printing step further comprises the steps of:

(a) transmitting a command for requiring transmission of said print data to said network address of said agent client;

(b) checking whether said print data is received from said agent client; and (c) printing said print data received from said agent client.

5. A printing network system, comprising:

a printer server with a network printer card, and at least one client network connected to said printer server;

a means for detecting a network address of an agent client for temporarily storing print data from said client when power is supplied to said printer server and when said client requires a next printing operation and said printer server is already engaged in a current printing operation;

a means for checking whether said printer server is engaged in a current printing operation when a next printing operation is required from said client;

a means for transmitting a print-rejection message and said detected network address of said agent client to said print operation-requiring client when said printer server is engaged in a current printing operation; and a means for printing said print data stored in said agent client when said current printing operation is completed.

6. The apparatus of claim 5, further comprising, a means for transmitting print data to be printed through said printer server to said network address of said agent client by said printing operation-requiring client when said print-rejection message is received from said printer server.

7. The apparatus of claim 5, wherein said means for detecting comprises:

a means for transmitting a message for requiring transmission of said network address of said agent client to said clients from said printer server;

a means for transmitting said network address of said agent client receiving said network address-requiring message among said clients to said printer server; and means for when said network address of said agent client is received, storing said network address in said printer server.

* * * * *